(12) United States Patent
Sydnor (10) Patent No.: US 10,107,143 B2
(45) Date of Patent: Oct. 23, 2018

(54) METHODS AND APPARATUS TO ADJUST HYDRODYNAMIC DESIGNS OF A HYDROKINETIC TURBINE

(71) Applicant: The Boeing Company, Chicago, IL (US)

(72) Inventor: Bryan J. Sydnor, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 14/842,662

(22) Filed: Sep. 1, 2015

(65) Prior Publication Data

US 2017/0058698 A1 Mar. 2, 2017

(51) Int. Cl.
*F01D 25/24* (2006.01)
*F01D 25/00* (2006.01)
(Continued)

(52) U.S. Cl.
CPC ............ *F01D 25/246* (2013.01); *F01D 5/12* (2013.01); *F01D 9/041* (2013.01); *F01D 25/005* (2013.01); *F03B 13/10* (2013.01); *F03B 13/264* (2013.01); *F03B 17/061* (2013.01); *F05B 2230/50* (2013.01); *F05B 2230/60* (2013.01); *F05B 2240/12* (2013.01); *F05B 2240/14* (2013.01); *F05B 2280/6003* (2013.01); *F05D 2220/30* (2013.01); *F05D 2230/50* (2013.01);
(Continued)

(58) Field of Classification Search
CPC ...... F02D 25/246; F01D 25/005; F03B 13/10; F03B 17/061; F03B 13/264
See application file for complete search history.

(56) References Cited

U.S. PATENT DOCUMENTS 3,320,747 A 5/1967 Denes
6,114,773 A 9/2000 Kouris
(Continued)

FOREIGN PATENT DOCUMENTS

WO WO 2010071976 A1 * 7/2010 ............. F03B 13/08
WO WO 2016129836 A1 * 8/2016 ............... F03B 3/12

OTHER PUBLICATIONS

Ruopp et al., "Development of a Hydro Kinetic River Turbine with Simulation and Operational Measurement Results in Comparison," 27th IAHR Symposium on Hydraulic Machinery and Systems, IOP Conf. Series: Earth and Environmental Science, vol. 22 (2013), p. 1-10; 10 pages.
(Continued)

*Primary Examiner* — Patrick Maines
(74) *Attorney, Agent, or Firm* — Hanley, Flight and Zimmerman, LLC (57) ABSTRACT

Methods and apparatus to adjust hydrodynamic designs of a hydrokinetic turbine are disclosed herein. An example method of generating hydrodynamic power via a hydrokinetic turbine includes identifying a first characteristic of a first location in a body of water where the turbine is to be installed and determining, based on the first characteristic of the first location, a geometry of a first turbine component of the turbine. The example method includes removably coupling the first turbine component to a frame of the turbine. The example method includes positioning the turbine including the first turbine component at the first location.

11 Claims, 4 Drawing Sheets

(51) Int. Cl.
    *F03B 13/10*     (2006.01)
    *F03B 17/06*     (2006.01)
    *F03B 13/26*     (2006.01)
    *F01D 9/04*     (2006.01)
    *F01D 5/12*     (2006.01)

(52) U.S. Cl.
    CPC ...... *F05D 2230/60* (2013.01); *F05D 2240/12* (2013.01); *F05D 2240/14* (2013.01); *F05D 2240/24* (2013.01); *F05D 2300/603* (2013.01); *Y02E 10/28* (2013.01); *Y02P 70/527* (2015.11)

(56) References Cited

U.S. PATENT DOCUMENTS

| | | | |
|---|---|---|---|
| 8,764,391 | B2 | 7/2014 | Smith et al. |
| 2007/0222219 | A1* | 9/2007 | Peckham .............. F03B 17/063 290/1 R |
| 2008/0179888 | A1* | 7/2008 | Krouse ................... F03B 13/08 290/54 |
| 2010/0327591 | A1 | 12/2010 | Dick et al. |
| 2011/0293404 | A1 | 12/2011 | Hamad et al. |
| 2012/0007361 | A1* | 1/2012 | Agtuca ..................... H02P 9/04 290/43 |
| 2012/0076648 | A1* | 3/2012 | McBride ................... F03B 3/02 415/204 |
| 2013/0129495 | A1* | 5/2013 | Farb ......................... F03B 1/00 415/201 |
| 2014/0154050 | A1* | 6/2014 | Campeanu .............. F03B 17/06 415/3.1 |

OTHER PUBLICATIONS

Kolekar et al., "Hydrodynamic Design and Optimization of Hydrokinetic Turbines Using a Robust Design Method," Proceedings of the 1st Marine Energy Technology Symposium (Apr. 2013), 10 pages.

\* cited by examiner

FIG. 4

METHODS AND APPARATUS TO ADJUST HYDRODYNAMIC DESIGNS OF A HYDROKINETIC TURBINE

FIELD OF THE DISCLOSURE

This disclosure relates generally to hydrokinetic turbines and, more particularly, to methods and apparatus to adjust hydrodynamic designs of a hydrokinetic turbine.

BACKGROUND

A hydrokinetic turbine captures energy from a flow of water to drive a generator to generate electricity that can be used on nearby land. Hydrokinetic turbines are typically placed in bodies of waters such as rivers and streams. Water flow characteristics such as velocity or flow patterns can differ across bodies of waters as well as within a body of water between a first position and a second position. The design of one or more components of a hydrokinetic turbine may be based on one or more characteristics of the body of water in which the turbine is to be placed.

SUMMARY

An example method of generating hydrodynamic power via a hydrokinetic turbine includes identifying a first characteristic of a first location in a body of water where the turbine is to be installed and determining, based on the first characteristic of the first location, a first geometry of a first turbine component of the turbine. The example method includes removably coupling the first turbine component to a frame of the turbine. The example method includes positioning the turbine including the first turbine component at the first location.

An example turbine to be placed in a body of water includes a generator having a frame, an inlet, a first set of vanes disposed in the inlet, a second set of vanes; and a shroud. The inlet, the first set of vanes, the second set of vanes, and the shroud are removably coupled to the frame. Also, in the example turbine, the first set of vanes is removably coupled to the inlet.

BRIEF DESCRIPTION OF THE DRAWINGS

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts.

DETAILED DESCRIPTION

A hydrokinetic turbine converts kinetic energy from flowing water into mechanical energy that rotates a shaft. The mechanical energy is used to drive a generator to create electrical energy. Hydrokinetic turbines are placed in bodies of water such as oceans, rivers, and streams, and use tidal waves or water currents to generate electricity without requiring the building of, for example, dams. Thus, hydrokinetic turbines provide a relatively low-cost means of generating electricity with minimal impact to the environment.

To efficiently capture a maximum amount of kinetic energy from flowing water, components of a hydrokinetic turbine are designed based on characteristics of the body of water in which the turbine is to be placed and, in particular, characteristics of a location or position in the body of water at which the turbine is to be installed. An example characteristic of a body of water such as a river is a velocity at which the river water flows. Increased velocity corresponds to increased kinetic energy of the water and, thus, increased power when that energy is captured by the hydrokinetic turbine. For example, a hydrokinetic turbine may be placed in a river having a velocity at or above approximately 2 knots (approximately 1 meter/second).

The velocity of water changes between positions within a body of water. For example, river water changes velocity along the course of the river due to factors such as a shape of the river (e.g., curvature, width), water volume, a gradient of the river, and objects such as rocks found in the water flow path. Thus, a velocity of flowing water measured at a first position in the river may differ from a velocity of water measured at a second position in the river (e.g., upstream or downstream relative to the first position, a position across the width of a body of water). Therefore, although components of a hydrokinetic turbine such as blades and an inlet diameter may be designed to efficiently capture the kinetic energy of the water at the first position, the same turbine component designs may not work as efficiently at the second position due to the change in velocity between the first and second positions. Generally, for every change in water velocity greater than one-half knot (e.g., $\Delta v > \frac{1}{2}$ knot), the design of one or more components of the turbine is modified to operate efficiently at the changed velocity range. Thus, installing a plurality of hydrokinetic turbines along a course of a river can require several differently designed hydrokinetic turbines depending on the changes in water velocity along the course of the river.

Prior to installing one or more hydrokinetic turbines in a body of water such as a river, the water velocities at various positions along the river are measured to create a map of the river based on river velocity ranges. A complete hydrokinetic turbine (e.g., including a generator, an inlet, blades, a shroud, etc.) is then designed and built for each river velocity range (or selected from pre-built complete turbines). As each turbine is made for a particular velocity range, a turbine cannot be easily repositioned along a river or placed in a different river velocity range if the turbine is not designed for that river velocity range. Rather, a new turbine is ordered and built for the particular river position and velocity range.

Turbines are typically constructed from integrally cast pieces formed of metal such as ductile iron. For example, molds are built for components such as an inlet portion of the turbine and a shroud portion of the turbine. The molded components are bolted together in a factory or on a shore near the water in which the turbine is to be installed. The turbine is then placed on a barge for delivery to the location in the water where the turbine is to be installed. If the turbine needs to be repositioned or if the water velocity range changes over a threshold amount, new molds may need to be built for casting turbine components that are designed for the water velocity range at the location where the turbine is to be moved to or for the changed water velocity range. A new turbine, including a generator section, is built with the newly casted components for delivery from, for example, a factory, to the water site.

The components of known turbines typically include one or more integrated parts. For example, drive vanes, which rotate about the shaft of the generator to drive the generator, are typically integrated with the generator. Also, an inlet portion of the turbine can include blades or vanes that are cast or integrated with an inlet frame. Thus, certain components of these known turbines, such as the drive vanes and the inlet vanes cannot be replaced to account for changes in water velocity or for maintenance without replacing the inlet assembly, the generator assembly, or the entire turbine.

Example methods and apparatus disclosed herein substantially eliminate the need for customized building of complete hydrokinetic turbines for each water velocity range of a body of water by providing a common generator section that can be used in substantially any velocity range and to which different designs for the intake, blades, and shroud can be removably coupled based on the velocity range at the location where the turbine is to be installed. In the examples disclosed herein, the components, including the drive vanes and inlet blades, are separable parts relative to each other and the generator section. The components are removably coupleable to a frame or skeleton of the common generator section. For example, an inlet portion having a first geometry, or diameter, can be replaced with an inlet portion having a second geometry, or (e.g., larger) diameter or other shape feature, for use with the same generator section. A first set of drive vanes having blades with a first geometry, or width or angle, can be replaced with a second set of drive vanes having blades with a second geometry, or width or angle, without having to replace the generator section of the turbine. Similarly, the inlet blades can be replaced without requiring replacement of the inlet portion of the turbine. Also, in the examples disclosed herein, one or more of the components may be formed from materials such as fiberglass or carbon fiber or any other or non-metallic material or any other non-cast material, which reduces the weight of the turbine structure as compared to cast metal pieces and facilitates ease of assembly and disassembly.

Thus, rather than building custom turbines for each velocity range, in the examples disclosed herein, differently designed or configured turbine components are selectively coupled to the common generator section based on turbine design characteristics or geometries particular to a water flow velocity at a particular turbine installation location. Example design characteristics or geometries include inlet diameter, blade width, shroud diameter, a degree of blade curvature (e.g., twist or angle), material thickness, etc. Therefore, a user can change the position of a turbine within the body of water without having to order a complete new turbine but, rather, by changing one or more components (e.g., having different geometric design properties or profiles) coupled to the generator section. The ability to modularly assemble the turbines at or near the installation location simplifies the assembly and installation process when a plurality of turbines are to be installed. Further, the example turbine disclosed herein can be modified to adjust to changes in water velocity over time (e.g., due to erosion or deposition in the body of water) or for maintenance by replacing one or more of the components with differently configured components rather than replacing the whole turbine, including the generator. Also, the selective coupling and decoupling of the turbine components can be performed on-site (e.g., on a barge in the water proximate to the installation location of the turbine) when the turbine is removed from the water rather than having to return the turbine to the shore or a factory to be reconfigured.

Figure 1:
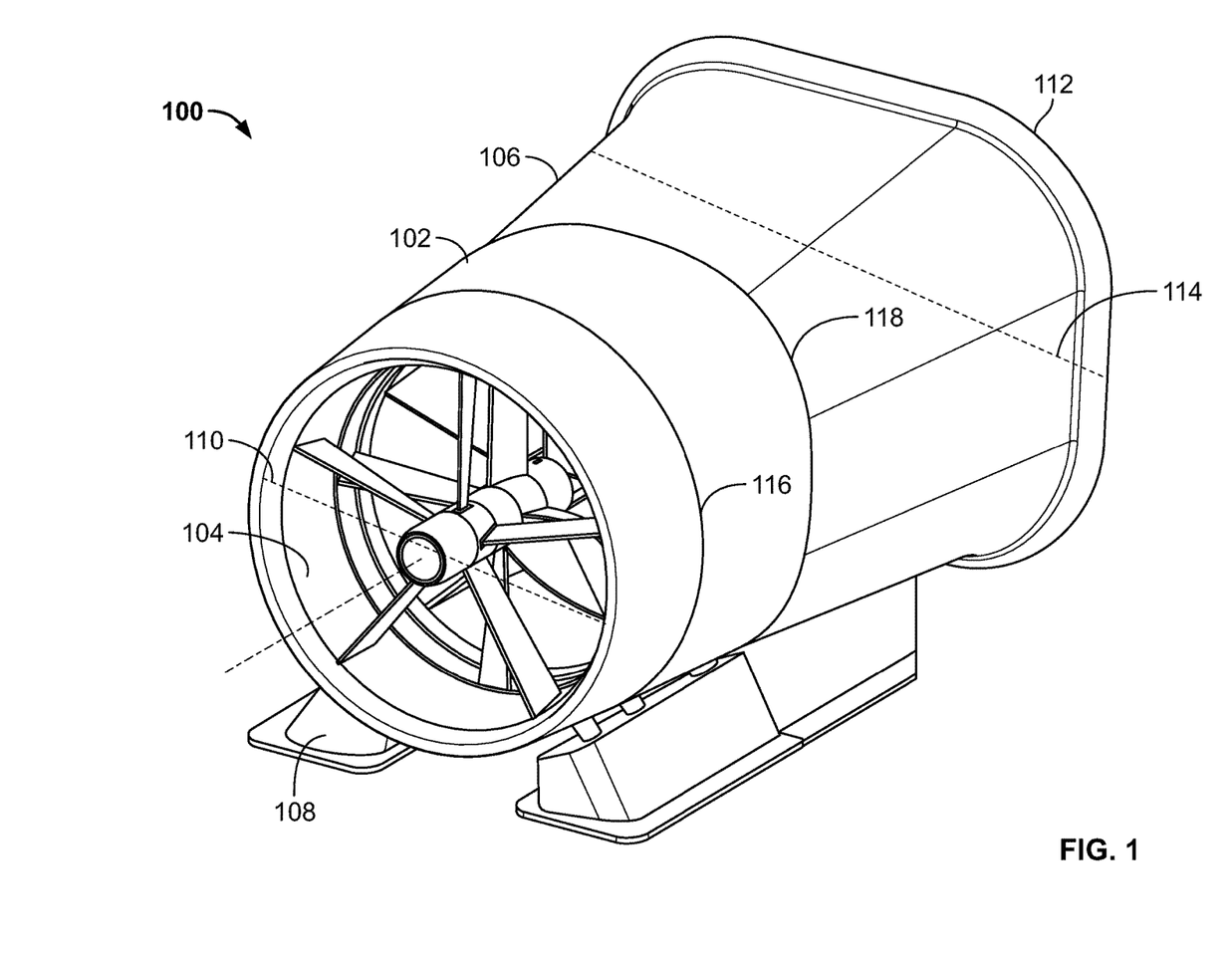
FIG. 1 is an example hydrokinetic turbine constructed in accordance with the teachings disclosed herein.

FIG. 1 is an example hydrokinetic turbine 100 including a generator 102, an inlet 104, and a shroud 106. To install the turbine 100 in a body of water such as a river, the generator 102, the inlet 104, and the shroud 106 are coupled (e.g., bolted) to a base 108. The inlet 104 has an inlet diameter 110. An opening of the shroud 106 opposite the inlet 104 forms an outlet 112 of the turbine. The outlet 112 of the shroud 106 has an outlet diameter 114.

As water flows through the inlet 104 and out the outlet 112, the velocity of the water (e.g., a speed of the water along an axis of the turbine 100 between the inlet 104 and the outlet 112) changes based on a cross-sectional area of the inlet 104 and a cross-sectional area of the outlet 112 (e.g., $\Delta v = v_{outlet} - v_{inlet}$, where $v_{outlet}$ is the velocity of the water at the outlet 112 and $v_{inlet}$ is the velocity of the water at the inlet 104). Changing the cross-sectional area of the inlet 104 and the cross-sectional area of the outlet 112 by adjusting the size of the respective inlet and outlet diameters 110, 114 changes the velocity of the water. For example, water flows at an increased velocity through smaller diameters. Thus, the change in velocity $\Delta v$ of the water flowing between the inlet 104 and the outlet 112 is a function of the respective inlet and outlet diameters 110, 114 of the inlet 104 and the outlet 112. Therefore, the geometries of the inlet 104 and/or the outlet 112, such as the size of the respective diameters 110, 114, can be changed to regulate the velocity of the water through the turbine 100.

In the example turbine 100, the inlet diameter 110 and the outlet diameter 114 are sized to slow the velocity of the water as the water flows between the inlet 104 and the outlet 112. Reducing the water velocity reduces, for example, turbulence of the water to efficiently capture the energy from the flowing water to drive the turbine 100. To reduce the water velocity, the shroud 106 is configured to expand the flow of water relative to the inlet 104, thereby allowing the water flow to slow down. For example, the outlet diameter 114 can be larger than the inlet diameter 110 such that as the water flows toward the shroud 106, the cross-sectional area through which the water flows increases, thereby changing (e.g., reducing) the velocity of the water.

The sizes of the inlet diameter 110 and the outlet diameter 114 can be based on, for example, the velocity of the water at the location where the turbine 100 is to be installed and a change in velocity (e.g., a predetermined value of $\Delta v$) to be achieved as the water flows through the turbine 100 to drive the turbine 100. To selectively change the velocity of the water flowing through the turbine 100, the inlet 104 and the shroud 106 are selected based on their respective diameters 110, 114 to obtain cross-sectional areas through which the water flows that result in the desired change in velocity $\Delta v$. For example, the inlet 104 and/or the shroud 106 may be pre-built components that can be selected from a range of inlets and shrouds having different diameters.

The selected inlet 104 and the shroud 106 are removably coupled to the generator 102 via mechanical fasteners such as bolts, studs, and/or other fastening devices. For example, the inlet 104 is removably coupled to the generator 102 at a first edge 116 (e.g., a first circumferential edge) of the generator 102. The shroud 106 is removably coupled to the generator 102 at a second edge 118 (e.g., a second circumferential edge) of the generator 102 opposite the first edge 116. Also, the generator 102, the inlet 104, and the shroud 106 can be removably coupled (e.g., via mechanical fasteners) to the base 108 for installation in a body of water.

Thus, the generator 102 of the example turbine 100 is adapted to receive inlets and shrouds having different geometries depending on the change in velocity Δv to be achieved, thereby resulting in a customized turbine 100 built from pre-fabricated, removable components. If, for example, the turbine 100 is to be moved from a first location to a second location in the body of water and the water at the second location has a different velocity than at the first location, the inlet 104 and/or the shroud 106 can be decoupled from the generator 102 and the base 108 (e.g., by removing the mechanical fasteners). The inlet 104 and/or the shroud 106 can then be replaced with an inlet and/or a shroud having respective diameters that result in a change in velocity Δv that efficiently drives the generator 102 in view of the installation of the turbine 100 at the second location, rather than ordering and/or building a complete new turbine including a generator section.

Figure 2:
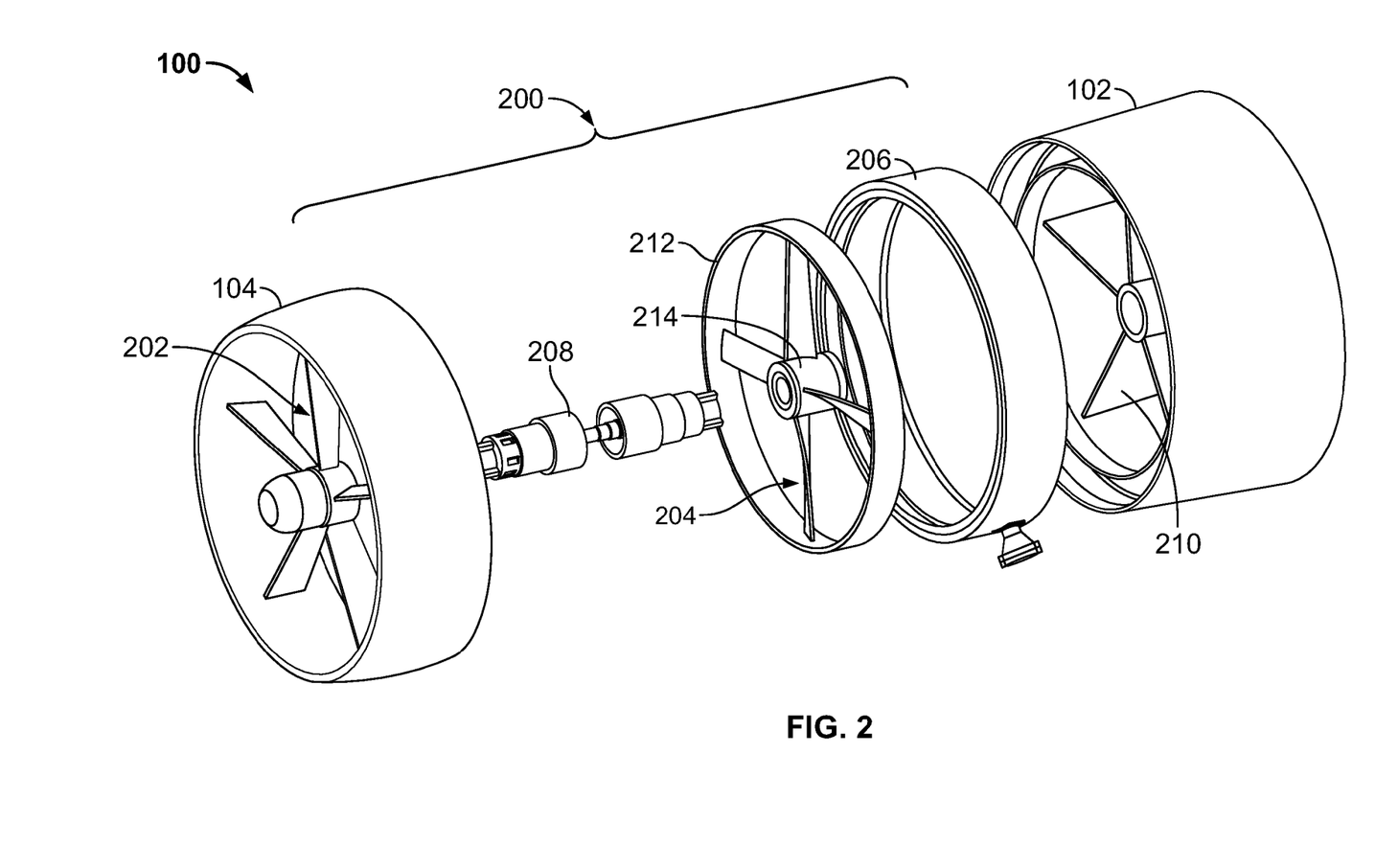
FIG. 2 is an exploded view of portions of the hydrokinetic turbine of FIG. 1.

The inlet diameter 110 and the outlet diameter 114 are configured to result in a change in velocity as the water flows between the inlet 104 and the outlet 112. To obtain the change in velocity Δv, the turbine 100 includes blades or vanes to reduce turbulent flow and resistance and increase efficiency. FIG. 2 is an exploded view of the example hydrokinetic turbine 100 of FIG. 1 including an intake portion 200 and the generator 102. The intake portion 200 includes the inlet 104, inlet or pre-swirl vanes 202, drive vanes 204, a static or non-moving support ring 206, and a shaft 208. The drive vanes 204, which are proximate to the generator 102 and distal to the pre-swirl vanes 202 relative to the inlet 104, rotate about the shaft 208. The generator 102 includes generator vanes 210 to support the shaft 208 in examples where the shaft 208 is supported by two bearings. However, in some examples, the generator 102 does not include the generator vanes 210. As will be disclosed below, the inlet 104, the pre-swirl vanes 202, and the drive vanes 204 are removably coupled to the generator 102. In some examples, the shaft 208 and the generator 102 provide a common skeleton or frame to which the inlet 104, the pre-swirl vanes 202, and the drive vanes 204 are removably coupled.

The pre-swirl vanes 202 and the drive vanes 204 provide for efficient conversion of hydrokinetic power by orienting the water as it flows into the inlet 104 to the generator 102. The flow of water in a body of water may not be uniform and can include, for example, vortices that result in increased resistance and turbulence. The pre-swirl vanes 202 swirl the incoming water to a predetermined degree of swirl based on geometric design properties of the pre-swirl vanes 202. For example, design properties of the pre-swirl vanes 202 such as a shape of the individual vanes or blades, a degree of curvature of the vanes (e.g., twist), a width of the vanes, a thickness of the vanes, a number of the vanes, and an amount of spacing between the vanes can affect the flow pattern of the water moving into and through the turbine 100. In some examples, the pre-swirl vanes 202 are at least partially housed within a circumference of the inlet 104 and, thus, are encountered as the water flows into the inlet 104.

The pre-swirl vanes 202 reduce variations in the water flow and orient the water by creating a substantially uniform flow (e.g., as a rotating vortex). Thus, the pre-swirl vanes 202 reduce flow resistance and turbulence, thereby increasing the operational efficiency of the turbine 100. Pre-swirling the water to substantially eliminate or reduce turbulence in the water before the water encounters the generator 102 increases the efficiency of the operation of the generator 102 in capturing hydrodynamic power.

As the water flows past the pre-swirl vanes 202, the water impinges on the drive vanes 204. Similar to the geometric design characteristics of the pre-swirl vanes 202, geometric design properties of the drive vanes 204 include blade shape, degree of curvature, size, number, etc. The drive vanes are disposed in a rim 212. Also, the drive vanes 204 are removably coupled to a drive vane frame 214, which is coupled to the shaft 208 such that the drive vanes 204 rotate with the shaft 208.

In the example turbine 100, the rim 212, including the drive vanes 204, is located within the static support ring 206. The design properties of the support ring 206, such as a diameter and thickness of the support ring 206, can be associated with the design properties of the rim 212, the drive vanes 204, and/or the inlet 104. For example, a diameter of the support ring 206 may be selected to accommodate the rim 212 and the drive vanes 204 within a circumference of the support ring 206 while being sized such that the inlet 104 can overlay or house the support ring 206 when the inlet 104 is coupled to the generator 102. In some examples, the support ring 206 is coupled to at least a portion of a frame or skeleton formed by the drive vanes 204. In operation, the drive vanes 204 rotate and cause the shaft 208 to rotate, which in turn drives the generator 102. In particular, the rim 212 includes one or more magnets. The support ring 206 can include, for example, a copper material such that rotation of the drive vanes 204 and the rim 212 within the support ring 206 generates power from the resulting magnetic field.

In some examples, the design properties or geometries of the pre-swirl vanes 202 and the drive vanes 204 such as a degree of curvature or angle are selected based on, for example, the desired change in velocity Δv. The pre-swirl vanes 202 and the drive vanes 204 can facilitate the extraction of the change in velocity Δv from the water flowing through the vanes 202, 204. In particular, whereas the diameter of the inlet 104 (e.g., the diameter 110 of FIG. 1) and the diameter of the outlet 112 of the shroud 106 (e.g. the diameter 114 of FIG. 1) determine the change in velocity Δv of the water flowing through the turbine 100, the pre-swirl vanes 202 and/or the drive vanes 204 optimize performance to achieve the predetermined change in velocity Δv as the water flows between the inlet 104 and the outlet 112. For example, the vanes 202, 204 impact the velocity of the water by reducing turbulent flow and changing or partially changing the flow of the water (e.g., causing an angular deviation via pre-swirling), which contributes to the overall change in velocity Δv. Thus, changing the design properties of the flow contact surfaces encountered by the flowing water such as the vanes 202, 204 can increase efficiency of the turbine 100 in achieving the desired change in velocity Δv of the water.

In some examples, the pre-swirl vanes 202 and the drive vanes 204 are made of a carbon fiber material to reduce the weight of the individual blade components and to facilitate ease of assembly. Further, any of the removable components disclosed in connection with the turbine 100, including the inlet 104, the shroud 106, the pre-swirl vanes 202, the drive vanes 204, and the support ring 206, can be formed from materials such as fiberglass, carbon fiber, concrete, fiber-infused concrete, and/or a composite material. Thus, the weight of the overall turbine 100 is reduced as compared to turbines constructed from one or more integrally cast metal components.

As disclosed above, the generator 102 provides a common skeleton or frame to which the inlet 104 and the vanes 202, 204 can be removably coupled (e.g., via mechanical fasteners such as bolts). The inlet 104, the vanes 202, 204, and the support ring 206 can be oriented about the shaft 208 such that the shaft 208 serves as a center bar structure for coupling the removable components to the generator 102. Further, the support ring 206 can provide an interface between the generator 102 and the inlet 104 to couple the inlet 104 to the generator 102. For example, the inlet 104 can extend over the support ring 206 at the point of coupling to the generator 102 (e.g., at the first edge 116 of the generator 102 as illustrated in FIG. 1).

Selectively coupling the inlet 104, the shroud 106, the pre-swirl vanes 202, the drive vanes 204, and the support ring 206 to the generator 102 results in the turbine 100, which is customized for the location in the body of water in which the turbine 100 is to be installed. In particular, the selective coupling of the aforementioned components based on hydrokinetic design properties of the components adapts the generator 102, to the body of water and the location at which the generator 102 is to operate. Thus, although the design of the generator 102 may be static or fixed, the overall design of the turbine 100 can be dynamically adjusted for different water flow rates by selectively coupling the inlet 104, the shroud 106, the pre-swirl vanes 202, and the drive vanes 204 to the generator 102 based on design properties of these removable components.

The modular design of the turbine 100 provides for increased flexibility with respect to assembly and disassembly of the turbine 100. If the water flow rate at the location where the turbine 100 is installed changes such that one or more of the components of the turbine 100 such as the inlet 104, the shroud 106, the pre-swirl vanes 202, and/or the drive vanes 204 are no longer operationally efficient with respect to obtaining the desired change in velocity Δv, the one or more components can be selectively removed and replaced with components having different design properties or characteristics selected based on the change in water flow rate. Further, because, for example, the pre-swirl vanes 202 are not integrally formed with the inlet 104, different sets of pre-swirl vanes 202 can be used with the same inlet 104. Similarly, different sets of drive vanes 204 can be used with the generator 102. Also, if the turbine 100 is to be moved from a first location to a second location, one or more of the components can be decoupled to facilitate ease of movement of the turbine. The one or more components can be re-coupled or replaced at the second location depending on the properties of the water at the second location. Thus, rather than building a new turbine to be installed at the second location, the generator 102 can be easily reconfigured for use at the second location.

Figure 3:
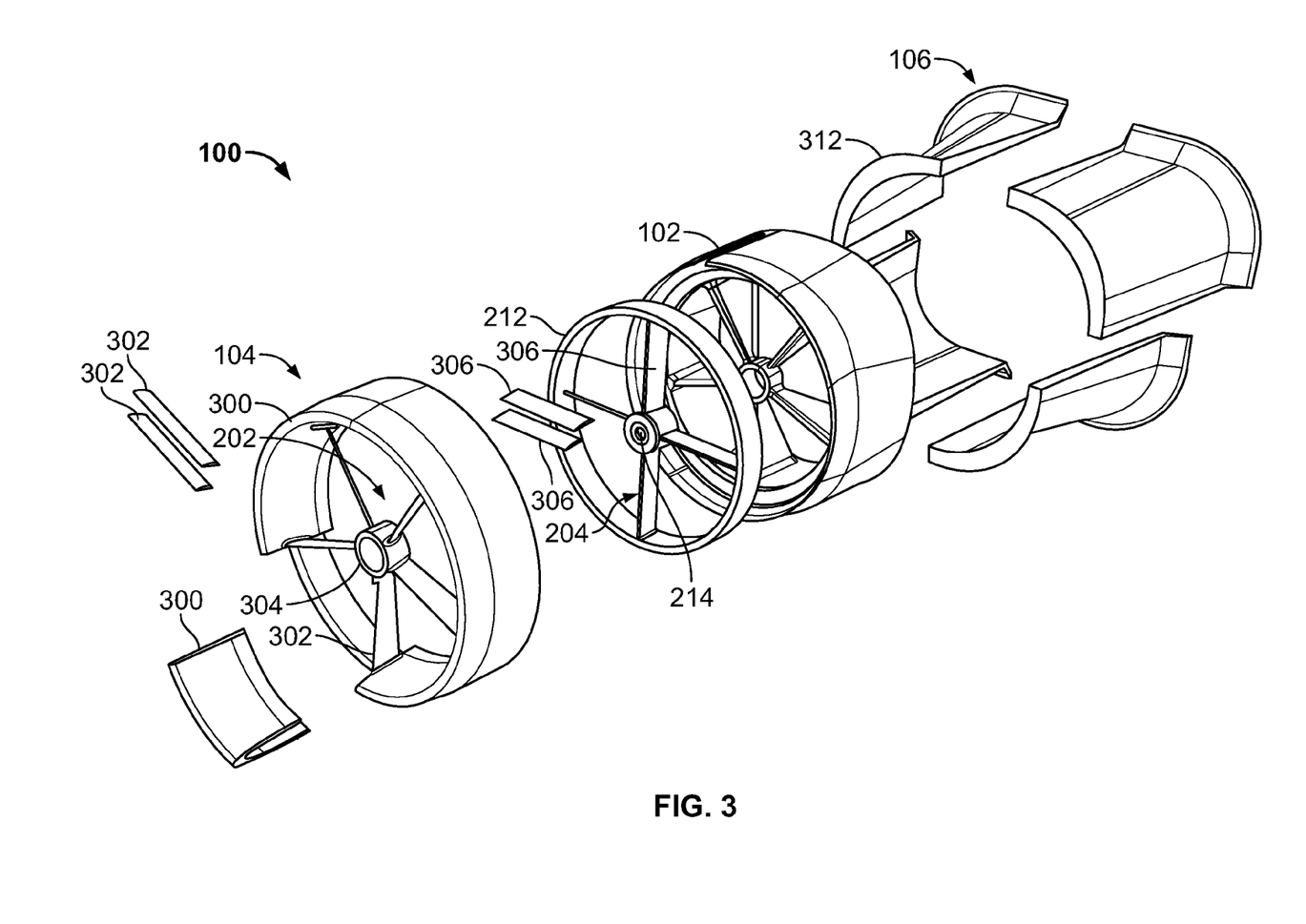
FIG. 3 is an exploded view of example components of the hydrokinetic turbine of FIGS. 1 and 2.

FIG. 3 is an exploded view of example components of the example hydrokinetic turbine 100 of FIGS. 1 and 2. In particular, FIG. 3 illustrates that one or more components of the example hydrokinetic turbine 100 are modular in design such that two or more pieces are coupled together to form the component. The modular design of the components of the example hydrokinetic turbine 100 facilitates ease of selective assembly and disassembly of the components for maintenance purposes and/or to address changes in water flow characteristics.

As illustrated in FIG. 3, the inlet 104 can include two or more inlet pieces, parts or sections 300 removably coupled (e.g., mechanically fastened) together to form the inlet 104. For illustrative purposes, one of the inlet pieces 300 is shown removed from the inlet 104 in FIG. 3. The inlet pieces 300 of the example inlet 104 include curved exterior surface pieces having design properties (e.g., size, shape, curvature) based on, for example, the desired inlet diameter 110 (FIG. 1) of the inlet 104. The inlet pieces 300 can be selectively uncoupled from one another for maintenance or to be replaced with other inlet pieces 300. Also, as disclosed above in connection with FIGS. 1 and 2, the inlet 104 is removably coupled to the generator 102 (e.g., via the inlet pieces 300). The inlet 104 can be selectively coupled or uncoupled from the generator 102 as an integral component formed from the inlet pieces 300 or by selectively coupling or uncoupling the inlet pieces 300 from the generator 102.

In some examples, the number of the inlet pieces 300 of the inlet 104 corresponds to the number of pre-swirl vanes 202 disposed in or proximate to the inlet 104. As shown in FIG. 3, the pre-swirl vanes 202 include pre-swirl vane parts 302 removably coupled to an inlet center frame 304. Although five pre-swirl vane parts 302 are shown disposed in the inlet 104 of in the example hydrokinetic turbine 100 of FIGS. 1-3, the hydrokinetic turbine 100 can include additional or fewer pre-swirl vane parts 302 based on, for example, a predetermined degree of swirl to be achieved in the water flowing through the inlet 104. For example, for illustrative purposes, FIG. 3 shows two additional pre-swirl vane parts 302, one or both of which could be coupled to the inlet center frame 304. Also, one or more of the pre-swirl vane parts 302 can be selectively uncoupled from the inlet center frame 304 to replace and/or repair the one or more pre-swirl vane parts 302 in view of, for example, wear and tear on the pre-swirl vane parts 302 from exposure of the pre-swirl vane parts 302 to water during operation of the example hydrokinetic turbine 100, or damage incurred during transportation or initial assembly of the turbine before installation in the body of water.

In the example hydrokinetic turbine 100 of FIG. 3, the drive vanes 204 include two or more drive vane parts 306 removably coupled to the drive vane frame 214. In the example hydrokinetic turbine 100, the drive vane parts 306 are also coupled to the rim 212. In some examples, the rim 212 is formed of an integral piece. In other examples, the rim 212 can be formed from two or more pieces.

Also, although the example hydrokinetic turbine 100 of FIGS. 1-3 includes four drive vane parts 306, the hydrokinetic turbine 100 can include additional or fewer drive vane parts 306. For example, for illustrative purposes, FIG. 3 shows two additional drive vane parts 306, one or both of which could be coupled to the drive vane frame 214. One or more of the drive vane parts 306 can be selectively removed or replaced as substantially disclosed above in connection with the pre-swirl vane parts 302.

The inlet center frame 304 and the drive vane frame 214 are removably coupled to the shaft 208 (FIG. 2) such that the pre-swirl vane parts 302 and the drive vane parts 306 rotate about the shaft 208. As disclosed above in connection with FIGS. 1 and 2, water flows through the inlet 104 and is rotated by the pre-swirl vanes 204 (e.g., the pre-swirl vane parts 302) and the drive vanes 204 (e.g., the drive vane parts 306) as the water flows toward and through the generator 102. As also disclosed above in connection with FIGS. 1 and 2, the water flows between the inlet 104 and the outlet 112 of the shroud 106 of the example hydrokinetic turbine 100. In the example hydrokinetic turbine 100 of FIGS. 1-3, the shroud 106 is a modularly designed component of the turbine 100.

For example, the shroud 106 can include two or more shroud pieces 312 coupled (e.g., bolted) together to form the cylindrical or substantially cylindrical shape of the shroud 106. In some examples, the shroud pieces 312 are exterior surface pieces coupled to an interior shroud skeleton or frame. Design characteristics of the shroud pieces 312 (e.g., shape, curvature, etc.) are based on, for example, the desired diameter 114 of the outlet 112 of the shroud 106. The shroud pieces 312 can be selectively uncoupled from one another for maintenance or to be replaced with other shroud pieces 312.

In the example hydrokinetic turbine 100, the shroud pieces 312 are removably coupled to one another and the generator 102. The shroud 106 can be selectively coupled or uncoupled from the generator 102 as an integral component formed from the shroud pieces 312 or by selectively coupling or uncoupling the shroud pieces 312 from the generator 102. Thus, the modular design of the shroud 106 with respect to the shroud pieces 312 facilitates ease of assembly and disassembly. Also, as the shroud pieces 312 of the example hydrokinetic turbine 10 are formed from, for example, carbon fiber, the modular design of the shroud 106 also reduces the weight of the shroud 106 and, thus, the turbine 100, as compared to large integrally cast metal shrouds.

Figure 4:
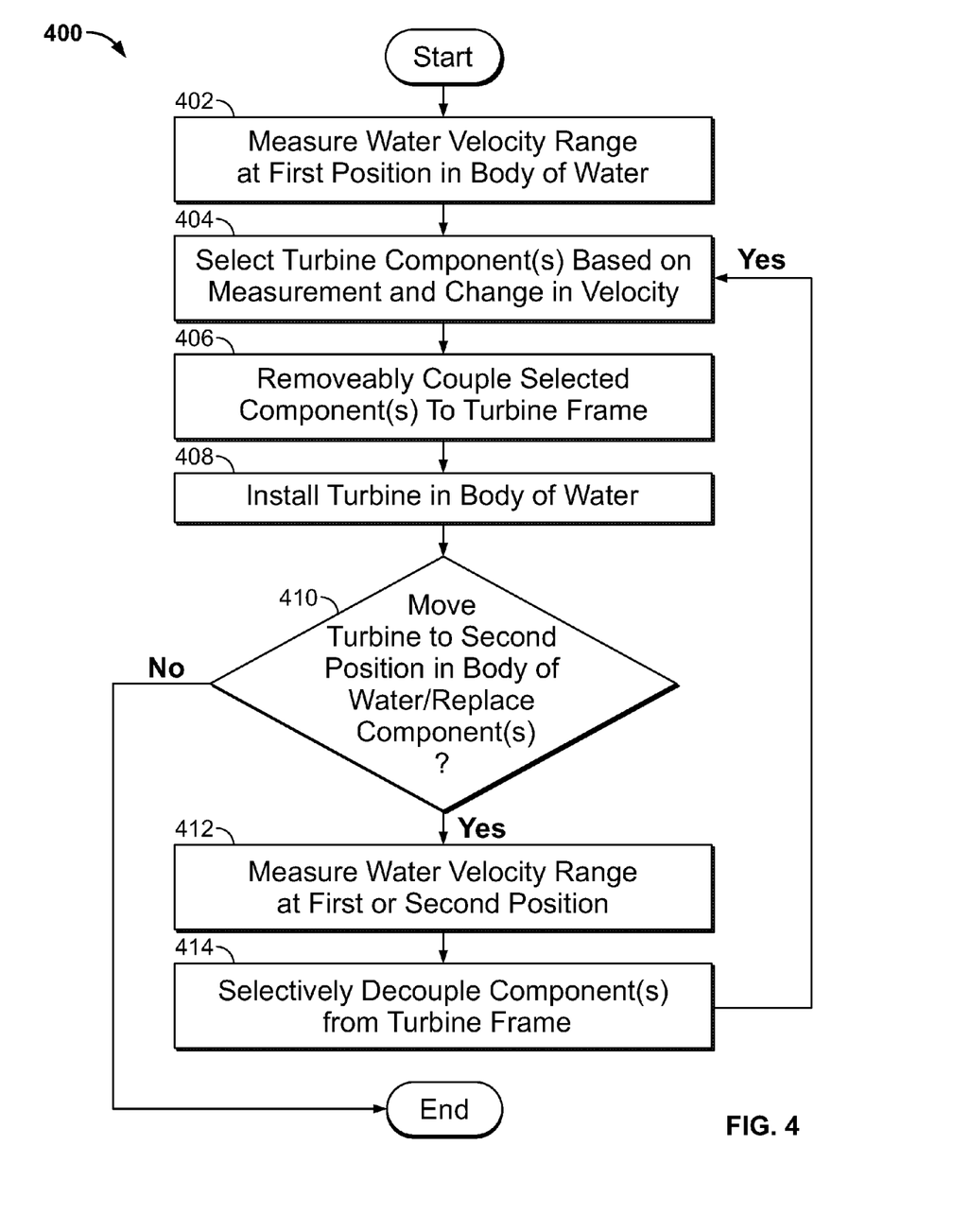
FIG. 4 is a flow diagram of an example method for constructing a hydrokinetic turbine from selective hydrodynamic components.

FIG. 4 is a flowchart of an example method 400 for generating hydrodynamic power and building a customized turbine from turbine components having hydrodynamic designs or properties selected based on properties such as water velocity. The example method 400 includes measuring (e.g., via a flowmeter) a water velocity range at a first position or location within a body of water at which a turbine (e.g., the turbine 100 of FIGS. 1-3) is to be installed (block 402). The body of water may be, for example, a river, and the first position may be a location along the course of the river where the turbine is to generate electricity for use on nearby land. In some examples, velocity is measured at several positions in the body of water (e.g., along the course of the river) to create a map of water velocity ranges for the body of water. In such examples, a position at which the turbine is to be installed may be selected based on the map.

Based on the measurement of water velocity at the first position, the example method 400 includes selecting one or more turbine components for the turbine (block 404). The turbine components can include, for example, an inlet (e.g., the inlet 104 of FIGS. 1-3, the inlet pieces 300 of FIG. 3), a shroud (e.g., the shroud 106 of FIGS. 1 and 3, the shroud pieces 312 of FIG. 3), pre-swirl vanes (e.g., the pre-swirl vanes 202 of FIGS. 2 and 3, the pre-swirl vane parts 302 of FIG. 3), and drive vanes (e.g., the drive vanes 204 of FIGS. 2 and 3, the drive vane parts 306 of FIG. 3). In view of the measured water velocity, the one or more turbine components are selected based on design properties or characteristics of the components that achieve a predetermined change in velocity $\Delta v$ as the water flows between the inlet of the turbine (e.g., the inlet 104) and an outlet of the turbine (e.g., the outlet 112 of the shroud 106). As disclosed above, the velocity of water flowing through a turbine can be adjusted (e.g., reduced) to capture the kinetic energy of the water to drive the turbine. In particular, in the example method 400, such an adjustment can be achieved in view of the water velocity measurement at the first location by selecting turbine components based on design properties of the components such as diameter with respect to the inlet and shroud outlet and blade curvature and count with respect to the pre-swirl vanes and drive vanes.

The example method 400 includes coupling the selected turbine components to a turbine frame (block 406). The turbine frame includes a generator (e.g., the generator 102 of FIGS. 1-3) and a shaft (e.g., the shaft 208 of FIG. 2) to drive the generator. In the example method 400, the turbine frame or skeleton is a common generator section in that the generator can operate in any or substantially any velocity range of a body of the water. In the example method 400, the selected components are removably coupled to the common generator section to customize the turbine for installation at the first position in view of the water velocity range at the first position. Put another way, the common generator section or turbine frame is adapted for use at the first position based on the coupling of the turbine components selected for the measured velocity range to the frame. As disclosed above in connection with FIG. 3, in some examples, coupling the turbine components to the turbine frame can include coupling one or more modular pieces of a respective turbine component to another modular piece of the turbine component (e.g., the inlet pieces 300 of the inlet 104 of FIG. 3). In such examples, the turbine component can be coupled to the turbine frame in a modular manner (e.g., via the individual pieces or parts such as the inlet pieces 300 of FIG. 3) or as an integral component (e.g., the inlet 104 is assembled from the inlet pieces 300 and the inlet 104 is coupled to the turbine frame as an integral component).

The turbine components can be removably coupled to the turbine frame via one or more mechanical fasteners. For example, the inlet, the pre-swirl vanes, and the drive vanes can be coupled to turbine frame proximate to an intake portion of the generator. The shroud can be coupled to the turbine frame opposite the generator intake portion to provide an outlet. Once the turbine is assembled, the turbine is installed in the body of water at, for example, the first position (block 408).

In the example method 400, after the turbine is installed at the first position, a decision may be made to move the turbine to a second position in the body of water and/or to replace the turbine components (block 410). For example, the turbine may be moved to the second position to generate electricity for nearby land at the second position. In other examples, one or more of the turbine components may be replaced due to wear. In some examples, the components are replaced due to a change in the water velocity at the first position over a threshold (e.g., a change in velocity over half a knot from the original measured water velocity range) such that the original components are no longer effective or efficient in achieving the change in velocity $\Delta v$.

If a decision is made to move the turbine and/or replace the turbine parts, the example method 400 includes measuring the water velocity range at the first position (e.g., re-measuring the water velocity range at the first position) or measuring the water velocity range at the second position (block 412). In examples where one or more of the turbine components are to be replaced but the turbine is to remain installed at the first position, re-measuring the water velocity range at the first position can verify that water velocity range at the first position has not changed or has not substantially changed over time (e.g., due to deposition) such that the selected design of the one or more turbine components is no longer appropriate for the turbine in achieving or efficiently achieving the predetermined change in velocity. In examples where the turbine is to be moved to a second position in the body of water, the water velocity range is measured at the second position to determine whether the water velocity range is different at the second position as compared to the first position. In both examples (i.e., replacing the turbine component(s) at the first position or moving the turbine to the second position), measuring the water velocity range provides for an opportunity to evaluate the design selection of the one or more turbine components in view of the measured water velocity.

To move the turbine or to replace one or more of the turbine components, the presently attached component or components are selectively decoupled from the turbine frame (block 414). In some examples, the components are selectively decoupled in a piecemeal manner based on the modular design of the components (e.g., the shroud pieces 312 of the shroud 106). When moving the turbine to a second position, decoupling the components and/or the modular parts of pieces of the components from the turbine frame facilitates ease of movement as compared to turbines built out of one or more integrally casted components. With respect to replacing one or more of the turbine components, for example, for maintenance purposes, selective decoupling of the turbine components allows for targeted maintenance in that rather than replacing the entire turbine, including the generator section, the components needing replacement can be decoupled from the turbine frame and replaced.

After decoupling the one or more turbine components from the turbine frame, the example method 400 returns to selecting turbine components to couple to the turbine frame based on the measured water velocity range (e.g., measured at the second position or re-measured at the first position) and the predetermined change in velocity to be obtained to drive the turbine (block 404). If, for example, the turbine is to be moved to the second position and the measured velocity range at the second position is different from the first position, the turbine components may be selected based on design properties associated with the water velocity range at the second position. The selected turbine components and/or the modular pieces of the components (or replacement components and/or the modular pieces of the components) are coupled to the turbine frame for continued operation of the turbine (block 406). Thus, the example method 400 provides for flexibility in constructing and operating the turbine, in that the common generator section can be adapted for use in different water velocity ranges without requiring a complete new turbine to be built. In the example method 400, decoupling the turbine components and/or the modular pieces of the components (block 414) and coupling or recoupling the turbine components and/or the modular pieces of the components (block 402) can occur on site or proximate to the first position or the second position in the water. For example, the turbine can be removed from the water and the assembly and/or disassembly can occur on a barge. Therefore, rather than returning the turbine to shore or a factory, the example method 400 provides for efficient maintenance of the turbine via modular, lighter weight components as compared to integrally cast turbine components.

From the foregoing, it will be appreciated that the above disclosed methods and apparatus provide for hydrokinetic turbine construction based on modular components selectively coupled to a common generator frame or skeleton. The modular components, which include turbine intake sections and vanes, can be pre-fabricated with different design properties for specific water velocity ranges. Based on a water velocity range at a location in a body of water at which the turbine is to be installed, the modular components can be selected for coupling to the common generator section to build a turbine that efficiently operates based on the water velocity range at the location of installation. A plurality of turbines can be efficiently assembled and installed at a variety of locations in a body of water having different flow conditions and without having to build and/or assemble custom turbine components, which can be numerous and large. Instead, in the examples disclosed herein, modular components are selectively assembled to meet particular design characteristics at the respective locations of installation. Further, the selected components can be removed and replaced to account for changes in water properties without requiring a new generator section. Thus, the examples disclosed herein provide for an efficient, cost-effective approach to turbine construction in that the generator section is adaptable for operation in different water velocity ranges. Thus, the generator section can be reused in different installation locations instead of requiring the building of complete, individual turbines that are limited to specific water velocity ranges.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of generating hydrodynamic power via a hydrokinetic turbine, the method comprising:
   identifying a first characteristic of a first location in a body of water where the turbine is to be installed;
   determining, based on the first characteristic of the first location, a first geometry of a first component of the turbine;
   removably coupling the first component to a frame of the turbine;
   positioning the turbine including the first component at the first location;
   decoupling the first component from the frame based on a second characteristic of a second location in the body of water; and
   removably coupling a second component of the turbine to the frame, the second component having a geometry based on the second characteristic of the second location of the body of water.

2. The method of claim 1, wherein the first characteristic is one of a water velocity or a flow pattern of the body of water at the first location.

3. The method of claim 1, wherein the frame is configured to couple to a plurality of components having respective design characteristics for a plurality of different flow conditions such that the turbine including the frame can be installed in the plurality of different flow conditions.

4. The method of claim 1, wherein the first component includes a plurality of modular pieces and removably coupling the first component to the frame comprises replaceably coupling the modular pieces of the first component to the frame.

5. The method of claim 1, wherein the first component is a pre-swirl vane, a drive vane, or a portion of an inlet.

6. The method of claim 1, further comprising positioning respective ones of a plurality of hydrokinetic turbines at each of a plurality of locations in the body of water, each of the plurality of locations having different flow conditions.

7. The method of claim 1, wherein the first component is an intake portion of the turbine and further comprising removably coupling blades to the frame, the blades to be disposed in the intake portion.

8. A method of generating hydrodynamic power via a hydrokinetic turbine, the method comprising:
   identifying a characteristic of a location in a body of water where the turbine is to be installed;
   determining, based on the characteristic of the location, a first geometry of a first intake portion of the turbine;
   removably coupling the first intake portion to a frame of the turbine;
   removably coupling a first outlet portion to the frame; and
   positioning the turbine including the first intake portion at the location, wherein the first geometry of the first intake portion and a first geometry of the first outlet portion are to cause a first change in velocity of water flowing through the turbine in the body of water.

9. The method of claim 8, further comprising:
identifying a change in the characteristic at the location of the body of water;
determining, based on the change in the first characteristic, a geometry of a turbine component; and
based on the determination, one of: (1) maintaining the coupling of the first intake portion to the turbine or (2) decoupling the first intake portion from the turbine and removably coupling a second component to the turbine, the second component having the geometry determined based on the change in the characteristic.

10. The method of claim 8, further comprising:
selectively decoupling at least one of the first intake portion or the first outlet portion from the frame; and
removably coupling at least one of a second intake portion or a second outlet portion to the frame to replace the respective first intake portion or the first outlet portion, wherein at least one of a second geometry of the second intake portion or a second geometry of the second outlet portion is to cause a second change in the velocity of the water flowing through the turbine in the body of water.

11. The method of claim 10, wherein the first geometry of the first intake portion is a diameter of the first intake portion and the first geometry of the first outlet portion is a diameter of the first outlet portion, the diameter of the first intake portion different from the diameter of the first outlet portion.

\* \* \* \* \*